(12) United States Patent
Kumar et al.

(10) Patent No.: US 9,979,583 B2
(45) Date of Patent: May 22, 2018

(54) METHODS AND SYSTEM FOR GENERATING A WAVEFORM FOR TRANSMITTING DATA TO A PLURALITY OF RECEIVERS AND FOR DECODING THE RECEIVED WAVEFORM

(71) Applicant: FREESCALE SEMICONDUCTOR, INC., Austin, TX (US)

(72) Inventors: Sharad Kumar, Austin, TX (US); Amin Abdel Khalek, Austin, TX (US); Yun Bai, Austin, TX (US); Balaji Tamirisa, Austin, TX (US)

(73) Assignee: NXP USA, Inc., Austin, TX (US)

( * ) Notice: Subject to any disclaimer, the term of this patent is extended or adjusted under 35 U.S.C. 154(b) by 131 days.

(21) Appl. No.: 14/865,032

(22) Filed: Sep. 25, 2015

(65) Prior Publication Data
US 2017/0093607 A1  Mar. 30, 2017

(51) Int. Cl.
*H04L 27/34* (2006.01)
*H04J 11/00* (2006.01)
*H04J 13/00* (2011.01)
*H04J 13/20* (2011.01)
*H04L 27/26* (2006.01)

(52) U.S. Cl.
CPC .............. *H04L 27/34* (2013.01); *H04J 11/00* (2013.01); *H04J 13/0048* (2013.01); *H04J 13/20* (2013.01); *H04L 27/265* (2013.01); *H04L 27/2646* (2013.01); *H04L 27/2671* (2013.01)

(58) Field of Classification Search
None
See application file for complete search history.

(56) References Cited

U.S. PATENT DOCUMENTS

| | | | | |
|---|---|---|---|---|
| 7,123,580 B2 * | 10/2006 | Tang | ................... | H04B 7/2628 370/210 |
| 7,161,895 B1 * | 1/2007 | Sudo | ................... | H04L 5/0044 370/204 |
| 7,680,211 B1 * | 3/2010 | von der Embse | .... | H04L 1/0071 375/130 |

(Continued)

OTHER PUBLICATIONS

Hikmet Sari, Georges Karam, and Isabelle Jeanclaude, Transmission Techniques for Digital Terrestrial TV Broadcasting, IEEE Communications Magazine, Feb. 1995, 100-109, IEEE Communications Society, New York City.

(Continued)

*Primary Examiner* — Robert C. Scheibel (57) ABSTRACT

Methods and a system are described for generating a waveform for transmitting data over a channel divided into a plurality of adjacent frequency subcarriers. One method includes receiving a plurality of data bits, each destined for a different receiver of a plurality of receivers. For each received data bit, the method further includes coding the data bit using a unique spreading code of a first set of spreading codes to generate a corresponding group of multiple copies of a data symbol. Additionally, the groups of data symbols, corresponding to the plurality of data bits, are interleaved to generate a sequence of interleaved data symbols, and the sequence of interleaved data symbols is mapped to the plurality of adjacent frequency subcarriers to generate a waveform symbol.

20 Claims, 7 Drawing Sheets

(56) References Cited

U.S. PATENT DOCUMENTS

| | | | |
|---|---|---|---|
| 2002/0136276 A1* | 9/2002 | Franceschini | H04L 1/0041 375/148 |
| 2002/0181421 A1* | 12/2002 | Sano | H04B 1/692 370/335 |
| 2003/0026200 A1* | 2/2003 | Fu | H04L 5/026 370/208 |
| 2004/0114671 A1* | 6/2004 | Inogai | H04L 27/2615 375/146 |
| 2005/0031018 A1* | 2/2005 | Papadimitriou | H04B 1/69 375/141 |
| 2005/0190817 A1* | 9/2005 | Batra | H04B 1/692 375/130 |
| 2006/0256839 A1* | 11/2006 | Tsai | H04L 5/0016 375/131 |
| 2009/0201849 A1* | 8/2009 | Sawahashi | H04B 7/0669 370/328 |
| 2015/0092872 A1* | 4/2015 | Keusgen | H04B 1/69 375/260 |
| 2017/0041097 A1* | 2/2017 | Kim | H04J 11/0023 |

OTHER PUBLICATIONS

Leonard J. Cimini, Jr., Analysis and Simulation of a Digital Mobile Channel Using Orthogonal Frequency Division Multiplexing, IEEE Transactions on Communications, Jul. 1985, 665-675, Vol. COM-33, No. 7, IEEE Communications Society, New York City.

* cited by examiner

METHODS AND SYSTEM FOR GENERATING A WAVEFORM FOR TRANSMITTING DATA TO A PLURALITY OF RECEIVERS AND FOR DECODING THE RECEIVED WAVEFORM

FIELD

The present disclosure relates generally to wireless access technologies and more particularly to methods and a system for generating a waveform for transmitting data to a plurality of receivers and for decoding the received waveform.

BACKGROUND

Communication systems for business and personal use that transmit data to one or multiple receivers at very high rates of speed, e.g., up to tens of GHz, with improved spectral efficiency are desirable. A popular wireless access technology used for digital modulation and encoding for high-speed data transmissions to multiple receivers is Orthogonal Frequency-Division Multiple Access (OFDMA). Multiple access is achieved in OFDMA by assigning, to multiple users, subsets of frequency subcarriers associated with a broadband wireless channel. However, the ability of current wireless access technologies, including OFDMA, to achieve high data throughputs with low block-error rates can be restricted by frequency selective fading due to multipath propagation between a transmitter and multiple receivers, multi-user interference, and frequency offset between the transmitter and receivers.

BRIEF DESCRIPTION OF THE DRAWINGS

In the accompanying figures, like reference numerals refer to identical or functionally similar elements throughout the separate views. The figures together with the detailed description below are incorporated in and form part of the specification. Moreover, the figures and the detailed description serve to further illustrate embodiments of concepts that include the claimed embodiments and explain various principles and advantages of those embodiments.

Embodiments of the present disclosure are illustrated by way of example and are not limited by the accompanying figures. Elements in the figures are illustrated for simplicity and clarity and have not necessarily been drawn to scale. For example, the dimensions of some elements in the figures may be exaggerated relative to other elements to help to improve understanding of the embodiments.

The apparatus and method components have been represented where appropriate by conventional symbols in the drawings. Some drawings show only those specific details that are pertinent to understanding the embodiments, so as not to obscure the disclosure with details that will be readily apparent to those of ordinary skill in the art having the benefit of the description herein. Also, the functions included in any flow diagrams do not imply a required order of performing the functionality contained therein.

DETAILED DESCRIPTION

Embodiments are described for generating a waveform containing data for transmitting to multiple receivers over a broadband channel and for decoding the waveform at each receiver. The embodiments leverage a pre-coding scheme, for instance using both orthogonal Walsh sequences and pseudorandom noise sequences, which can achieve better frequency diversity, reduce multi-user interference, and optimally utilize the channel through adaptive modulation.

Figure 1:
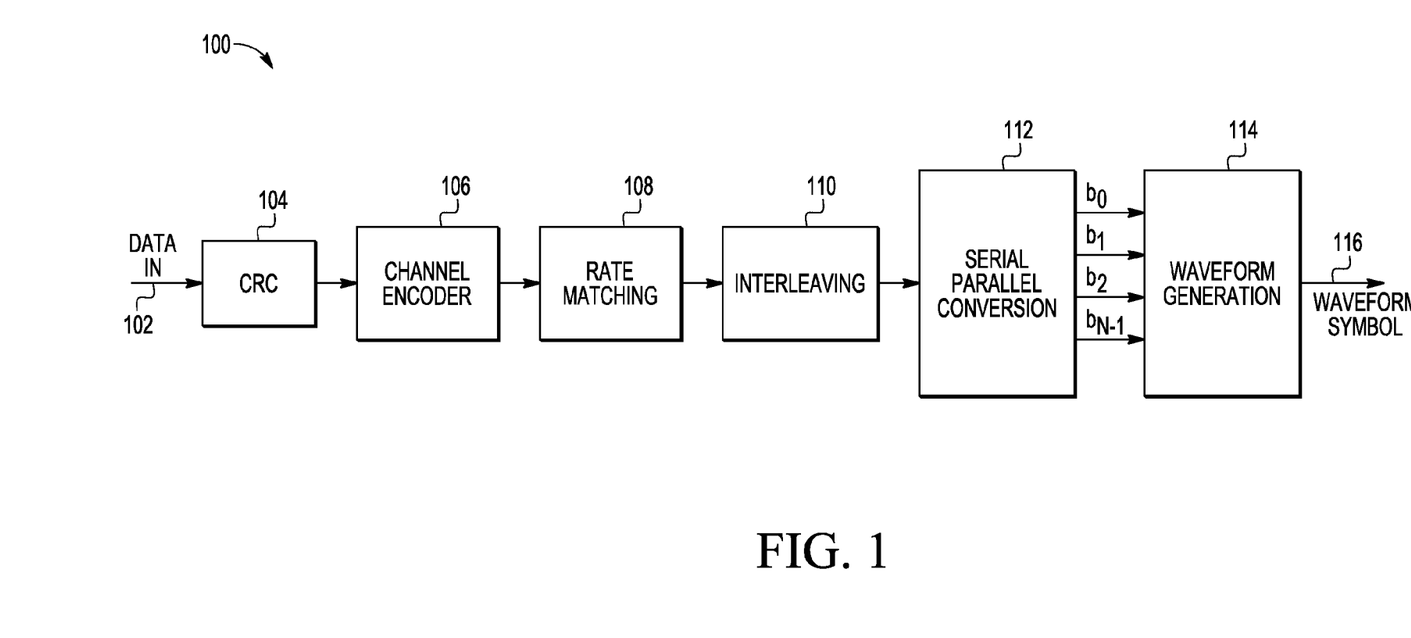
FIG. 1 illustrates a block diagram of a transmitter system, or transmitter, configured with a waveform generator in accordance with an embodiment.

FIG. 1 illustrates a transmitter 100 that is configured to generate a waveform for transmitting data to a plurality of receivers (not shown) over a channel divided into a plurality of adjacent frequency subcarriers, in accordance with an embodiment. For one example, a different user operates each receiver of the plurality of receivers. Transmitter 100 can be implemented as logic and/or circuitry, such as various shift registers and logic gates, within a transceiver integrated circuit (IC) that also includes receiver logic and/or circuitry. However, such a configuration is not required. Thus, the transmitter and receiver systems may occupy different hardware platforms. For an example, the transmitter 100 is configured to communicate within a cellular system such as a Long-Term Evolution (LTE) or WiMax system or other broadband cellular system, or within a Wireless Local Area Network (WLAN) such as a WiFi network. For another example, the transmitter 100 is included in a base station or other network infrastructure device that transmits to multiple receivers on a downlink channel.

As shown, the transmitter 100 includes a cyclic redundancy check (CRC) block 104, a channel encoder block 106, a rate matching block 108, an interleaving block 110, a serial-to-parallel conversion block 112, and a waveform generation block (or waveform generator) 114. The blocks 104, 106, 108, 110, and 112 have conventional functionality, as described briefly below. However, the waveform generator 114 is configured with circuitry and functionality to implement the present teachings.

During operation, the transmitter 100 can receive data-in 102 for a plurality of receivers and generate waveform symbols 116 that include the data-in 102 for transmitting to the plurality of receivers. The transmissions occur over a channel resource having a given total bandwidth, which the transmitter 100 logically divides into multiple adjacent frequency subcarriers (also referred to herein simply as subcarriers) usually of equivalent bandwidth. A waveform symbol 116, for one embodiment, includes and is used to transmit an amount of data-in 102 that is modulated onto a block of the multiple adjacent frequency subcarriers over a given time period or time slot $T_s$. The bandwidth of the block of subcarriers corresponding to the waveform symbol is B, and, for an embodiment, $T_s=1/B$. The data-in 102 can represent video, audio, and/or other data and have any format suitable for processing in the transmitter 100, such as raw, i.e., unencoded, digital data in the form of a serial bit stream from a Medium Access Control (MAC) layer. For example, the serial bit streams includes multiple bits having a binary value of 1 or 0 or any other suitable value.

More particularly to the operation of the transmitter 100, the CRC block 104 receives the data-in 102 for the plurality of receivers. The CRC block 104 applies an algorithm, based on a cyclic code, to the data-in 102 to generate a check value that is attached to the data. The check value enables the receiver to detect data corruption or other errors. The channel encoder 106 applies an error-correcting code, e.g., a forward error correction (FEC) technique, to the data-in 102 to create redundancy. FEC enables the receiver, in some instances, to correct enough of any detected errors to properly decode the received data without requesting a retransmission. The rate matching block 108 creates a specific sized "transport block" from the data-in 102, which can be based on a particular communication technology used, for instance a particular standard for wireless communication such as LTE. The interleaving block 110 rearranges the data-in 102 in the time domain, to improve the performance of the error-correcting code, for instance when the errors occur in bursts.

Since, the data-in 102 will be transmitted over a plurality of adjacent subcarriers, the serial data stream from the interleaving block 110 is converted, in the serial-to-parallel converter 112, into multiple (in this case N) parallel data streams provided to the waveform generator 114. For the embodiment described, each data stream of the N data streams is destined for a different receiver of a plurality (N) of receivers. Shown are N bits, $b_0, b_1, b_2 \ldots b_{N-1}$, one bit from each of the N data streams, provided to the waveform generation block 114 and destined for the N different receivers. A single waveform symbol 116 can contain N bits or a multiple of N bits. However, for ease of description, a single waveform symbol 116 is described herein as containing the N bits shown, $b_0, b_1, b_2 \ldots b_{N-1}$.

Figure 2:
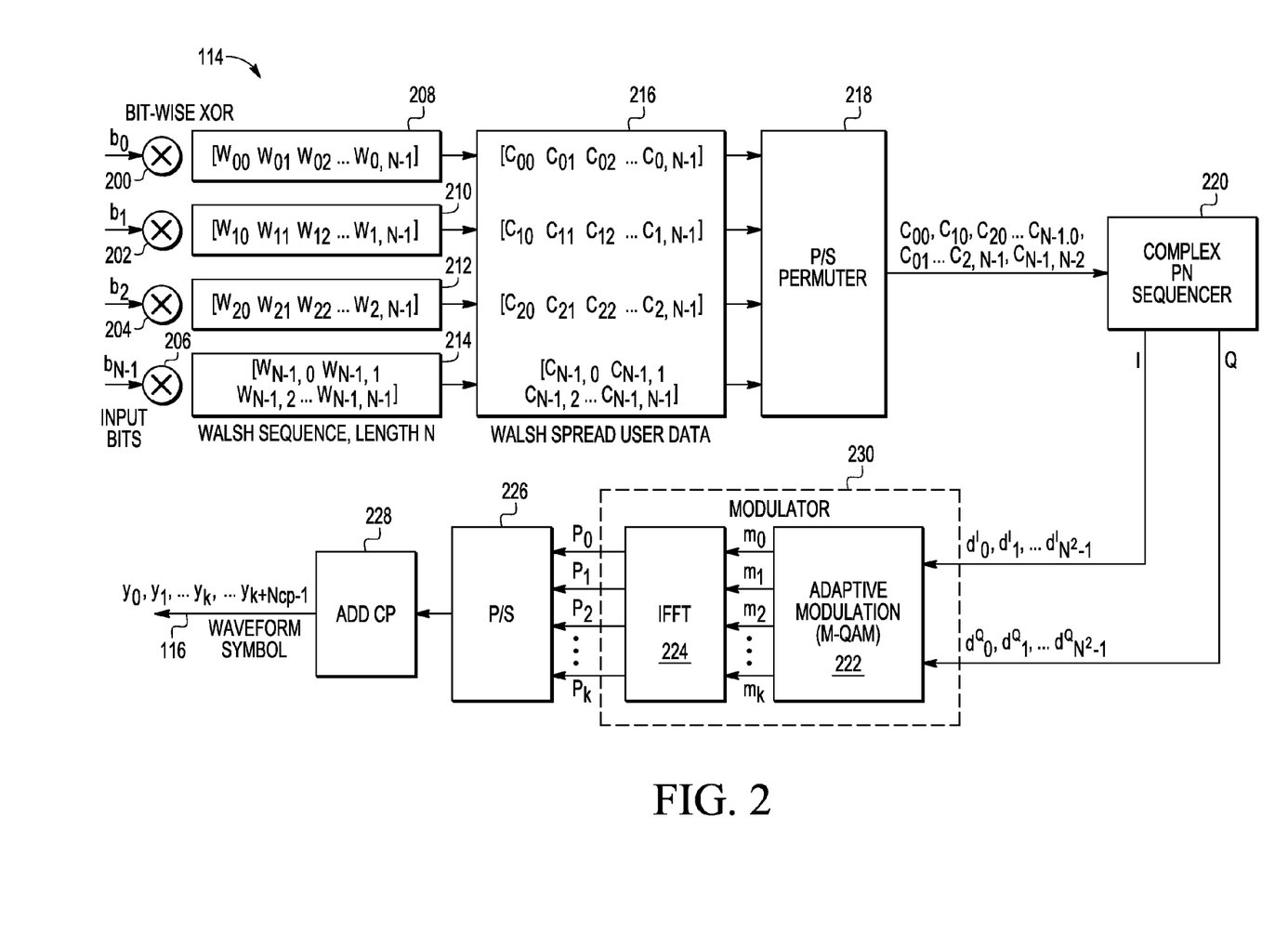
FIG. 2 illustrates a block diagram showing details of the waveform generator shown in FIG. 1, in accordance with an embodiment.

FIG. 2 illustrates the data processing performed by the waveform generation block 114 to generate a waveform symbol 116 for transmitting the N data bits, $b_0, b_1, b_2 \ldots b_{N-1}$, to the N different receivers over a channel that is divided into a plurality of adjacent frequency subcarriers. In general, the processing by the waveform generation block 114 includes, for each received data bit, coding the data bit using a different or unique spreading code of a first set of spreading codes to generate a corresponding group of multiple copies of a data symbol. This coding is said to be performed in or by a "data spreader." The processing also includes interleaving the groups of data symbols, corresponding to the plurality of data bits, to generate a sequence of interleaved data symbols. The interleaving is said to be performed in or by an "interleaver." "Interleaving," within the waveform generation block 114, means forming a sequence by rearranging, in an alternating pattern arrangement, members of multiple sequences, in this case data symbols within the multiple groups of data symbols. The processing further includes mapping the sequence of interleaved data symbols to the plurality of adjacent frequency subcarriers to generate the waveform symbol 116. The mapping is said to be performed in or by a "modulator." Specifics of the coding, interleaving, and mapping is next described.

For an embodiment, the received N bits, $b_0, b_1, b_2 \ldots b_{N-1}$, are initially coded using a first set of spreading codes that are orthogonal time-domain spreading codes. For example, the spreading codes are a set of Walsh sequences or Walsh codes 208, 210, 212, 214 having a length or spreading factor of M.

For one particular embodiment, the length M of the spreading sequence is equal to the number of receivers and, in this example the number of bits, which is N. Having M=N maintains orthogonality between the data of the different receivers irrespective of the orthogonality between the plurality of subcarriers that carry the data. The Walsh codes are created using a Hadamard Matrix and transform to provide the orthogonality between the codes. In essence, having the length of the Walsh code equal to the number of receivers allows the transmitter 100 to create separate and distinct communication channels for each of the receivers, with the data in one channel for a particular receiver appearing as noise to the other receivers.

Namely, in the prior art, to address inter-carrier interference when sending data for multiple receivers over a channel divided into a plurality of adjacent frequency subcarriers, the transmitter selects the frequency and spacing of the subcarriers (for purposes of digital sampling using an inverse fast Fourier Transform for instance) to satisfy the Nyquist Theorem. The Nyquist Theorem requires that $f_s > 2B$, where $f_s$ is the sampling frequency of a signal being sampled, and B is the bandwidth of the signal being sampled. This sampling criterion maintains orthogonality between the subcarriers to prevent the inter-carrier interference. However, for the embodiments of the present teachings where the initial spreading codes are selected to be orthogonal, such as where the length of the Walsh code equals the number of receivers, the frequency and spacing of the subcarriers can be selected such that the subcarriers are non-orthogonal and digital sampling is, thereby, carrier out at sub-Nyquist rates.

For another embodiment, the length M of the Walsh sequence is adjusted based on factors including, but not limited to, total carrier bandwidth, subcarrier spacing, and/or delay spread. For example, where the channel is in a deep fade, a higher Walsh sequence (one with a longer length) is used. This allows serving more users, wherein each user gets a proportionally smaller data rate due to the smaller subcarrier spacing. Whereas, a smaller Walsh sequence (with a shorter length) can be used for a flatter channel, which increases the subcarrier spacing and thus the data rate per user. "Flatness" of a channel can be estimated using a rake receiver by measuring the energy in different multipath components and figuring out the time difference between the significant components. Flatness could also be estimated by comparing frequency-domain channel estimates per subcarrier.

In general, the embodiment described in the preceding paragraph gives the transmitter additional flexibility in determining the length of the Walsh sequences, subcarrier spacing, and modulation scheme based on, for instance, the number of receivers of the waveform symbol and based on a delay spread or frequency selective fading of the channel due to multipath propagation. The frequency selective fading is reflected in the coherent bandwidth, which is inversely proportional to the delay spread. The delay spread represents the difference between time of arrival of the earliest and latest received multipath components.

Returning to the initial coding of the N bits, $b_0, b_1, b_2 \ldots b_{N-1}$, each receiver is allocated a different or unique Walsh sequence, with which its bit(s) are combined using an exclusive or (XOR) operation or gate. This combination of XOR operations and Walsh sequences serves as the aforementioned data spreader. As shown, bit $b_0$ is correlated or combined with Walsh sequence 208 [$W_{00} \ W_{01} \ W_{02} \ldots W_{0,N-1}$] using XOR operation 200 to generate a group of data symbols [$c_{00} \ c_{01} \ c_{02} \ldots c_{0,N-1}$], also referred to herein as a chip and a Walsh spread sequence. The group of data symbols is made up of multiple copies of a same data symbol, which may be exact copies or copies multiplied by some factor, where each copy of the data symbol includes the bit $b_0$ data. Bit $b_1$ is correlated with Walsh sequence 210 [$W_{10}$ $W_{11}$ $W_{12}$ ... $W_{1,N-1}$] using XOR operation 202 to generate chip [$c_{10}$ $c_{11}$ $c_{12}$ ... $c_{1,N-1}$] having multiple copies of a same data symbol, with each copy including the bit $b_1$ data. Bit $b_2$ is correlated with Walsh sequence 212 [$W_{20}$ $W_{21}$ $W_{22}$ ... $W_{2,N-1}$] using XOR operation 204 to generate chip [$c_{20}$ $c_{21}$ $c_{22}$ ... $c_{2,N-1}$] having multiple copies of a same data symbol, with each copy including the bit $b_2$ data. Bit $b_{N-1}$ is correlated with Walsh sequence 214 [$W_{N-1,0}$ $W_{N-1,1}$ $W_{N-1,2}$ ... $W_{N-1,N-1}$] using XOR operation 206 to generate chip [$c_{N-1,0}$ $c_{N-1,1}$ $c_{N-1,2}$ ... $c_{N-1,N-1}$] having multiple copies of a same data symbol, with each copy including the bit $b_{N-1}$ data.

The result of the Walsh sequence spreading of the bits $b_0$, $b_1$, $b_2$ ... $b_{N-1}$ is an M×N matrix 216 of the groups of data symbols, where: M equals the length of the Walsh sequence, which in this case equals N; N equals the number of receivers in the plurality of receivers; and each row of the matrix 216 includes the group of data symbols generated for a different one of the received data bits $b_0$, $b_1$, $b_2$ ... $b_{N-1}$. An interleaving block or interleaver 218 interleaves the groups of data symbols, corresponding to the plurality of data bits, to generate a sequence of interleaved data symbols. In general, the interleaving performed in block 218 transforms the matrix 216 from parallel data into serial data by interleaving or rearranging the multiple sequences, which are the multiple chips, in some sort of alternating pattern.

As shown, the interleaving block 218 is a parallel-to-serial (P/S) permuter that interleaves the data symbols of the matrix 216 by reading the data symbols of the matrix 216 column-by-column into a sequence of interleaved data symbols, a portion of which is shown as [$c_{00}$ $c_{10}$ $c_{20}$ ... $c_{N-1,0}$, $c_{01}$, ... $c_{2,N-1}$, $c_{N-1,N-1}$]. This columnwise reading of the groups of data symbols enables or facilitates frequency diversity by spreading the data bits $b_0$, $b_1$, $b_2$ ... $b_{N-1}$ in the frequency domain. Accordingly, the sequence of interleaved data symbols can be mapped to the plurality of adjacent frequency subcarriers such that no two copies of the data symbol within any chip are mapped to directly adjacent frequency subcarriers. Particularly, the columnwise reading of the groups of data symbol maximizes frequency diversity by spreading copies of bits equally and as far apart in the frequency domain as allowable given the number of receivers.

A block 220 applies a second set of spreading codes to the sequence of interleaved data symbols to differentiate which group of data symbols is destined for which receiver of the plurality of receivers. As illustrated, block 220 is a complex pseudorandom noise (PN) sequencer that applies or correlates, to the sequence of interleaved data symbols provided by the P/S permuter block 218, a set of complex pseudorandom noise sequences or codes, as the second set of spreading codes. Each complex pseudorandom noise sequence in the set: includes an in-phase pseudorandom noise sequence and a quadrature pseudorandom noise sequence; has low correlation (also referred to in the art as cross-correlation) with other pseudorandom noise sequences in the set; and is assigned or allocated to a different receiver in the plurality of receivers.

Each complex PN code has a spectrum similar to that of a random sequence but is deterministically generated by a PN generator, and can therefore be reproduced in the receivers. Low correlation provides for a symmetrical spectrum, which aids in decorrelation at each receiver. Applying the complex PN codes also mitigates against multi-user interference since other receivers' data appears as noise when decorrelated using the PN code assigned to a particular receiver.

Figure 3:
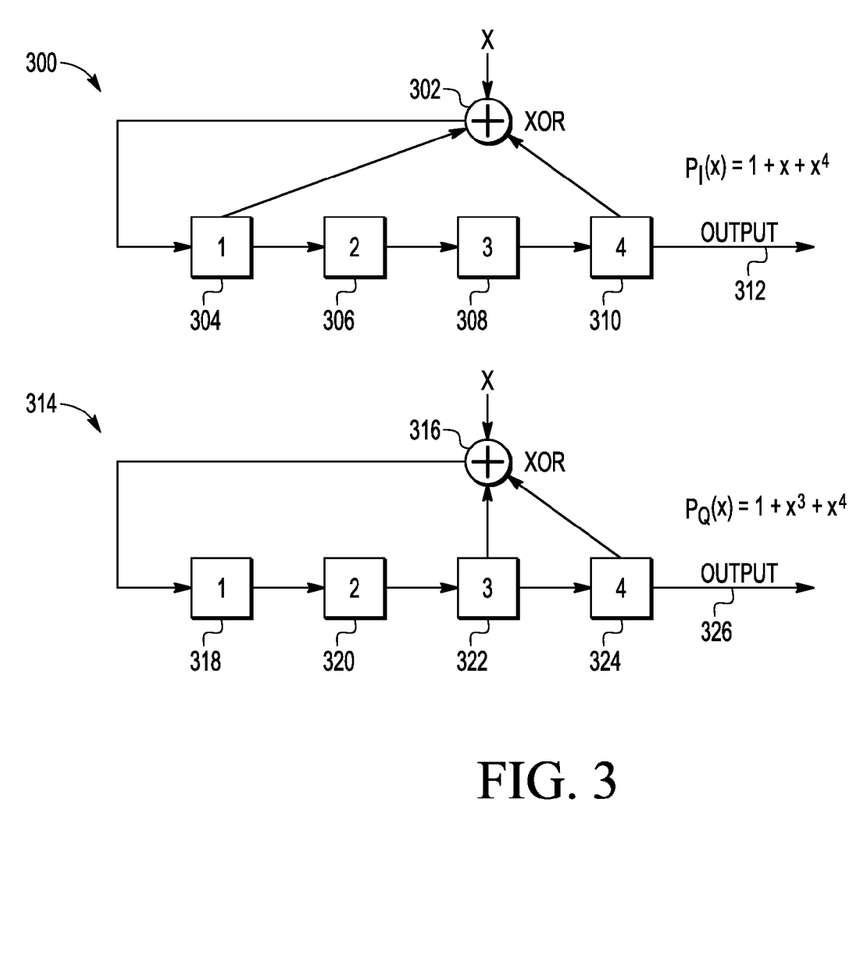
FIG. 3 illustrates a schematic diagram showing details of a complex pseudorandom noise sequencer shown in FIG. 2, in accordance with an embodiment.

One example implementation of a PN generator for generating the set of complex PN sequences, which includes a different or unique complex PN sequence allocated to each receiver, is illustrated by reference to FIG. 3. The complex PN generator includes first 300 and second 314 linear feedback shift registers (LFSRs). The first LFSR 300 is configured to generate a plurality of in-phase (I) pseudorandom noise sequences for correlating to the sequence of interleaved data symbols to generate an in-phase sequence of interleaved data symbols [e.g., $d^I_0$, $d^I_1$, ... $d^{I2}_{N-1}$]. The second LFSR 314 is configured to generate a plurality of quadrature (Q) pseudorandom noise sequences for correlating to the sequence of interleaved data symbols to generate a quadrature sequence of interleaved data symbols [e.g., $d^Q_0$, $d^Q_1$, ... $d^{Q2}_{N-1}$].

The LFSR 300 is illustrated as a maximal LFSR of length four and having associated therewith a polynomial $P_I(x)=1+x+x^4$, to generate the I sequences at an output 312. Accordingly, the LFSR 300 includes four cells 304, 306, 308, 310 and an XOR operation 302. Taps from the cells 304 and 310 feed the XOR operation 302. The LFSR 314 is illustrated as a maximal LFSR of length four and having associated therewith a polynomial $P_Q(x)=1+x^3+x^4$, to generate the Q sequences at an output 326. Accordingly, the LFSR 314 includes four cells 318, 320, 322, 324 and an XOR operation 316. Taps from the cells 322 and 324 feed the XOR function 316.

As shown, the LFSRs 300 and 314 generate different or unique PN sequences using a different offset dependent on the taps going into the XOR operations. Here the LFSRs generate codes having a length N. Nonetheless, more than N receivers can be supported with the generated PN sequences at the expense of a loss of exact orthogonality, given the orthogonality of the Walsh sequences used in the initial coding. Additionally, interference between receivers is further mitigated due to the low correlation between the PN sequences, which enables the bits destined for the different receivers to be distinguished during a decorrelation process in the receivers using the assigned or allocated PN sequence.

During a given time period of operation, each receiver of the plurality of N receivers to which the transmitter 100 is sending data is allocated a different or unique in-phase and quadrature sequence pair generated by the LFSRs 300 and 314. The time period could be, for instance, for the entire duration of the transmission. Alternatively, multiple times during the entirety of the transmission, the PN generator generates a new set of complex PN sequences to apply to the interleaved data symbols. A (e.g., first) complex PN sequence allocated to a given (e.g., first) receiver is applied only to the data for that first receiver. This allows maximum correlation to the first receiver's data and minimum correlation to other receivers' data when the first receiver correlates its allocated first complex PN sequence to the received one or more waveform symbols 116. The transmitter 100 communicates with the first receiver information to enable the first receiver to generate the first complex PN sequence, for instance using similar logic as shown in FIG. 3.

The modulator 230 is configured to map the sequence of interleaved data symbols to the plurality of adjacent frequency subcarriers to generate the waveform symbol 116. For example, the modulator 230 includes a mapper 222 and an iDFT block 224. The mapper 222 is configured to apply a modulation scheme to the I and Q sequences of interleaved data symbols provided by the sequencer 220 to generate a plurality (k) of modulation symbols (m). The block iDFT 224 is configured to apply an inverse discrete Fourier transform (iDFT) to the modulation symbols output from the mapper 222 to generate a plurality (k) of time domain symbols (P), which are processed in remaining blocks 226 and 228, as described later, to generate the waveform symbols 116.

As particularly illustrated, the mapper 222 is an adaptive mapper that applies a modulation scheme having an adjustable data rate to the sequence of interleaved data symbols to generate the k modulation symbols. As shown, the mapper 222 applies a selected one of multiple quadrature amplitude modulation (QAM) orders each characterized by a different data rate to the sequence of interleaved data symbols. For an embodiment, one of a plurality of different QAM orders (e.g., QPSK, 16-QAM, 64 QAM, 256 QAM, etc.) is selected based on channel conditions as reflected in parameters including, but not limited to, one or more of: signal strength on each subcarrier; signal-to-noise ratio derived from channel estimates; Channel Quality Indicator (CQI) in LTE systems; channel delay spread; etc. The channel conditions can be represented as feedback from one or all of the intended receivers based on, for example, the receivers receiving a known training sequence of pilot symbols sent by the transmitter 100 in training subcarriers. The receivers then perform channel estimation based on the training sequence to measure the channel conditions.

For instance, a controller (not shown) receives the channel conditions feedback, e.g., channel estimates or CQI, from the one or more receivers and selects a QAM order based thereon. For a first approach, each receiver estimates the channel using training subcarriers, quantizes the channel estimate, and feeds back an index of the quantized channel estimate to the transmitter using a few bits of information. For a second approach where the channel is reciprocal, i.e. the downlink and uplink use the same frequency band, the transmitter can estimate and use the uplink channel without requiring explicit feedback. Moreover, since different receivers are served on different subcarriers, different QAM orders can be selected for different receivers. Alternatively, a single QAM order is selected based on the worst channel estimate among the receivers. The controller communicates the selected QAM order(s) to the receivers and to the waveform generator block 114 to apply the selected QAM in block 230. For another embodiment mentioned above, the block 114 can also adjust the length of the Walsh sequence based on the channel delay spread, or otherwise based on the channel conditions.

For an example scenario, the channel estimate on one of the subcarriers suggests a low received signal strength. For instance, the signal strength is close to or below the noise floor. The controller therefore selects the lowest order modulation order, e.g., QPSK, due to a higher expected bit error rate, to maintain reliable transmission and reception. By contrast, if the channel has good conditions, e.g., as compared to the noise floor, the controller can select a modulation order with a higher bit rate to send the data, due to the lower expected bit error rate.

The adaptive mapper 222 receives the I sequence of $N^2$ data symbols and the Q sequence of $N^2$ data symbols from the sequencer 220 and maps the complex sequences to a block of subcarriers, represented as frequency offset indices, to generate k modulation symbols $[m_0, m_1, m_2, \ldots m_k]$. Pilot symbols could also be added (not shown) to aid in channel estimation. The number of modulated symbols, k, generated by the mapper 222 depends on the modulation order used and is represented by equation (1).

$$k = (2*N*M)/\log_2(O) \tag{1}$$

where N is the number of receivers, M is the Walsh sequence length, and O is the size of the modulation alphabet for the selected modulation order. For QPSK, the size of the modulation alphabet is 4. So, the number of modulation symbols generated in this case, where M=N, is $k=2N^2/2=N^2$. For 16-QAM, the modulation alphabet is 16 and so on.

Moreover, as particularly illustrated, the iDFT block 224 is configured to apply an inverse Fast Fourier Transform (IFFT), as the iDFT, to the plurality of modulation symbols $[m_0, m_1, m_2, \ldots m_k]$. This converts the modulation symbols from the frequency domain to a plurality (k) of time domain symbols $[P_0, P_1, P_2, \ldots P_k]$. The P/S block 226 converts the time domain symbols $[P_0, P_1, P_2, \ldots P_k]$ from parallel to serial, and the block 228 adds a cyclic prefix (CP) to the time domain symbols to generate the waveform symbol 116 $[y_0, y_1, y_2, \ldots y_k, \ldots y_{k+Ncp-1}]$. The CP acts as a guard interval to eliminate interference between waveform symbols. For an embodiment, the length of the CP is larger than the expected delay spread.

As mentioned above, at least for the embodiment where the Walsh sequences are orthogonal, e.g., where the length M equals the number of receivers N, the modulator 230 can be configured or controlled to map the sequence of interleaved data symbols to the plurality of adjacent frequency subcarriers, e.g., by sampling at a higher sampling rate in the IFFT block 224 and packing more modulation symbols into each subcarrier, which causes at least a portion of the plurality of adjacent frequency subcarriers to be non-orthogonal.

Figure 4:
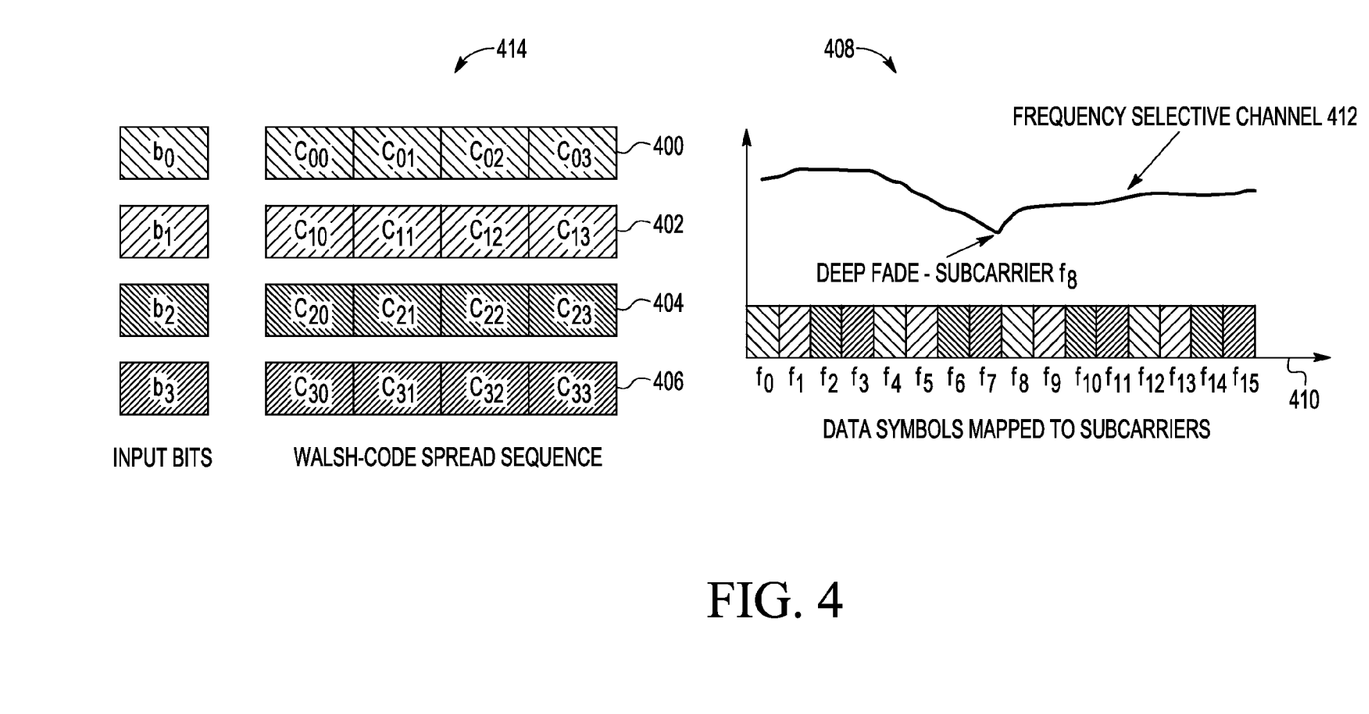
FIG. 4 illustrates diagrams showing frequency selectivity, frequency-domain resource allocation, and frequency diversity for a waveform generated in accordance with an embodiment.
Figure 5:
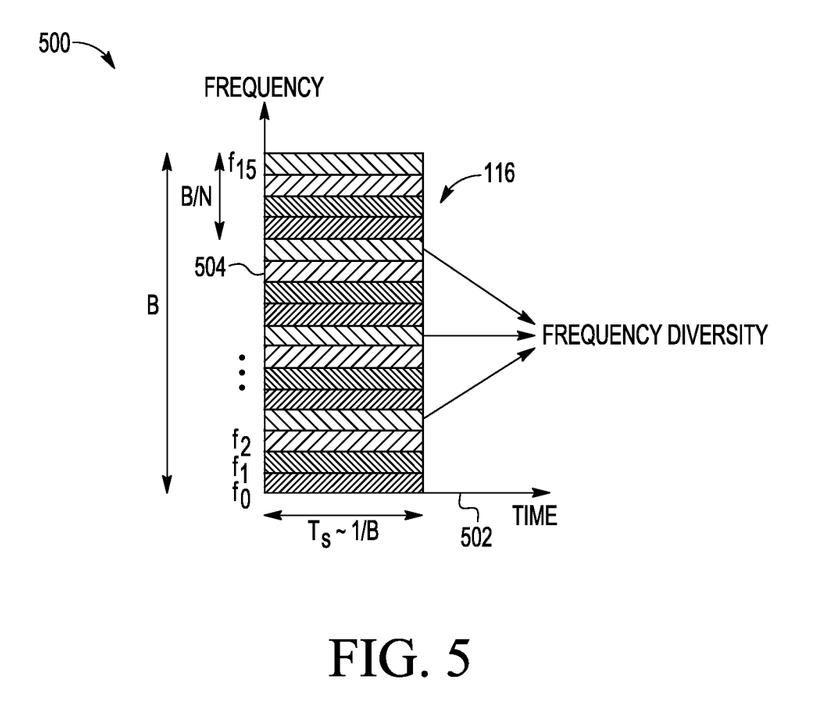
FIG. 5 illustrates another diagram showing frequency-domain resource allocation and frequency diversity for a waveform generated in accordance with an embodiment.

FIGS. 4 and 5 provide pictorial representations of some benefits of implementing at least one embodiment of the waveform generator 114, for instance the embodiment illustrated in and described by reference to FIG. 2. For one example scenario, the number of receivers is 4. Accordingly, the waveform generator 114 receives bits $b_0$, $b_1$, $b_2$, and $b_3$ from the serial-to-parallel converter 112. The waveform generator 114 XORs the received bits with Walsh sequences allocated to the respective receivers of the bits to generate corresponding chips 400, 402, 404, 406.

As shown, chip 400 includes multiple copies of a data symbol having the $b_0$ data and is represented as data symbols $[c_{00}\ c_{01}\ c_{02}\ c_{03}]$. Chip 402 includes multiple copies of a data symbol having the $b_1$ data and is represented as data symbols $[c_{10}\ c_{11}\ c_{12}\ c_{13}]$. Chip 404 includes multiple copies of a data symbol having the $b_2$ data and is represented as data symbols $[c_{20}\ c_{21}\ c_{22}\ c_{23}]$. Chip 406 includes multiple copies of a data symbol having the $b_3$ data and is represented as data symbols $[c_{30}\ c_{31}\ c_{32}\ c_{33}]$. Chips 400, 402, 404, and 406 are logically arranged as a 4×4 matrix 414 of data symbols, with each chip occupying a different row of the matrix 414. The data symbols of the matrix 414 are read columnwise into a sequence of data symbols that are processed in blocks 220 and 230 of the waveform generator 114. Moreover, for purposes of this example scenario, the selected QAM order is QPSK.

Diagram 408 of FIG. 4 illustrates a frequency distribution, along an axis 410, of the data symbols of the matrix 414 mapped over 16 frequency subcarriers, e.g., $f_0$ to $f_{15}$, of a channel. Namely, the data symbols of chip 400 are mapped to subcarriers $f_0$, $f_4$, $f_8$, and $f_{12}$. The data symbols of chip 402 are mapped to subcarriers $f_1$, $f_5$, $f_9$, and $f_{13}$. The data symbols of chip 404 are mapped to subcarriers $f_2$, $f_6$, $f_{10}$, and $f_{14}$. The data symbols of chip 406 are mapped to subcarriers $f_3$, $f_7$, $f_{11}$, and $f_{15}$. Diagram 408 concurrently shows a waveform 412 illustrating the frequency selectivity of the channel over the 16 frequency subcarriers. Subcarrier $f_8$ carrying data symbol $c_{02}$ is shown to be in a deep fade. However, a receiver could still recover bit $b_0$ using subcarriers $f_0$ carrying data symbol $c_{00}$, $f_4$ carrying data symbol $c_{01}$, and $f_{12}$ carrying data symbol $c_{03}$. Accordingly, spreading multiple copies of a data symbol over a channel experiencing frequency selective fading using the waveform generator 114 can improve bit error rate performance at the receiver.

FIG. 5 illustrates a diagram 500 pictorially showing a waveform symbol 116 superimposed on time 502 and frequency 504 axes. The waveform symbol 116 carries the data symbols of the matrix 414 during a time slot $T_s=1/B$, where B is the total frequency occupied by the 16 subcarriers. As shown, no two data symbols of the same chip occupy adjacent frequency subcarriers. Additionally, maximum frequency diversity can be achieved, even where traditional Nyquist sampling of B/N or B/4 is not used. Namely, the sampling rate can be increased over the prior art to pack more modulation symbols into the subcarriers and allow the subcarriers to interfere or overlap in the frequency domain when orthogonality is provided by the Walsh sequences. For the example illustrated in FIG. 5, the subcarrier separation between all the subcarriers is B/4N or B/16. This implies, for instance, that $f_0$ causes interference for $f_1$, $f_2$, and $f_3$. However, this interference is nulled by means of Walsh code orthogonality across receivers, in accordance with the present teachings. The advantage of this configuration over the traditional Nyquist separation in prior OFDM/OFDMA art is flexibility in receiver assignment, support for more receivers in the same bandwidth, and better use of frequency diversity.

Figure 6:
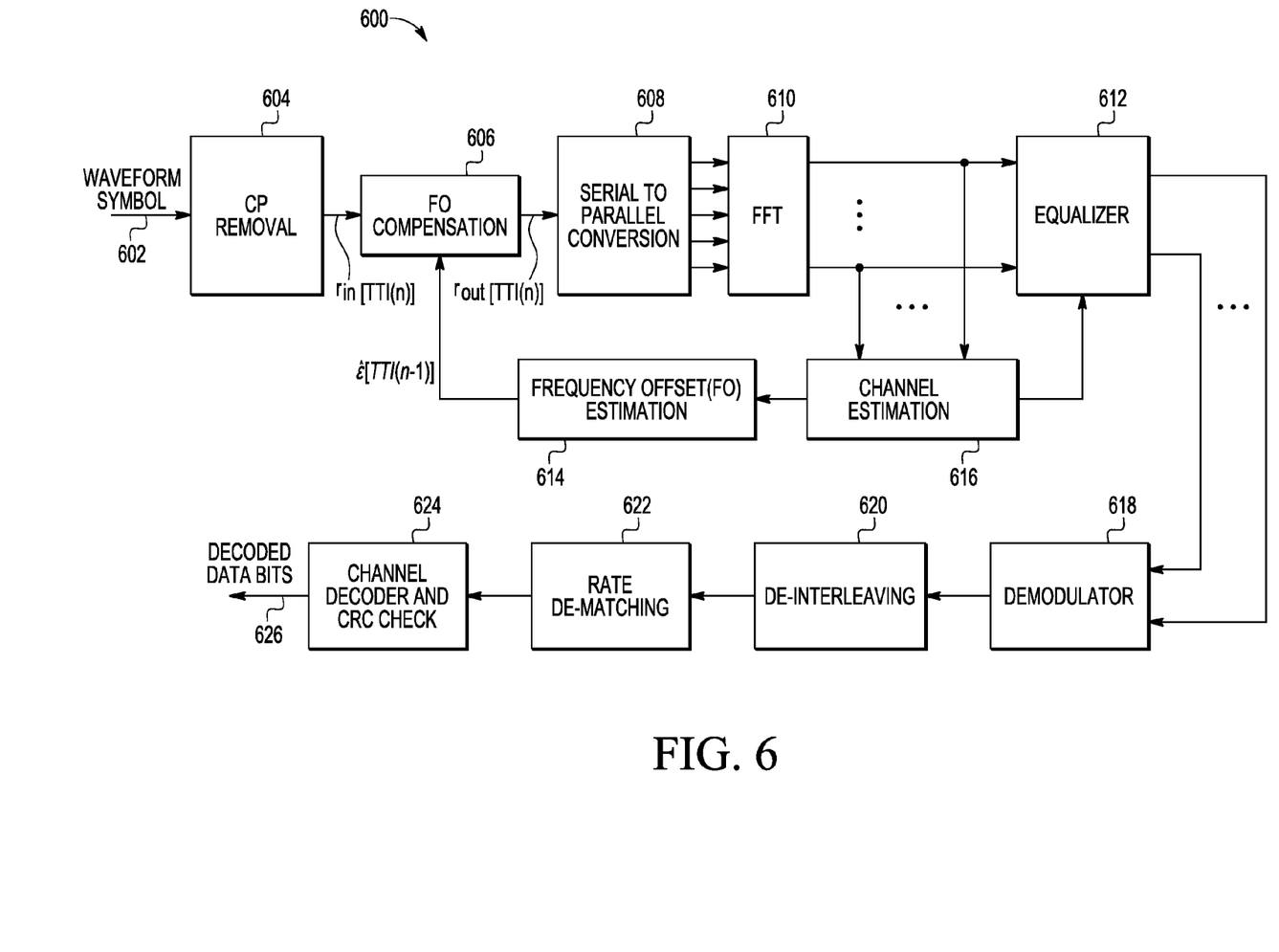
FIG. 6 illustrates a block diagram of a receiver system, or receiver, configured in accordance with an embodiment.

FIG. 6 illustrates a block diagram of a receiver system 600 configured in accordance with an embodiment. Receiver 600 is configured to decode one or more received waveform symbols 602, having data for a plurality of receivers, in order to recover one or more data bits 626 destined for the receiver 600. In the example scenario described below, the waveform symbol(s) 602 received by the receiver 600 represents the waveform symbol(s) 116 transmitted by the transmitter 100.

The receiver 600 includes a CP removal block 604, a frequency offset (FO) compensation block 606, a serial-to-parallel conversion block 608, a DFT block 610, an equalizer block 612, a channel estimation block 616, a FO estimation block 614, a demodulator 618, a de-interleaving block 620, a rate de-matching block 622, and a channel decoder and CRC check block 624. Receiver 600 can be implemented as logic and/or circuitry, such as various shift registers and logic gates, within a transceiver IC that also includes transmitter logic and/or circuitry. However, such a configuration is not required. Thus, the transmitter and receiver systems may occupy different hardware platforms. Moreover, the blocks 604, 608, 610, 612, 616, 620, 622, and 624 have conventional functionality, as described briefly below. However, the FO compensation 606, FO estimation 614, and demodulator 618 blocks are configured with circuitry and functionality to implement the present teachings. The specifics of the demodulator 618 are described by reference to FIG. 7.

Figure 7:
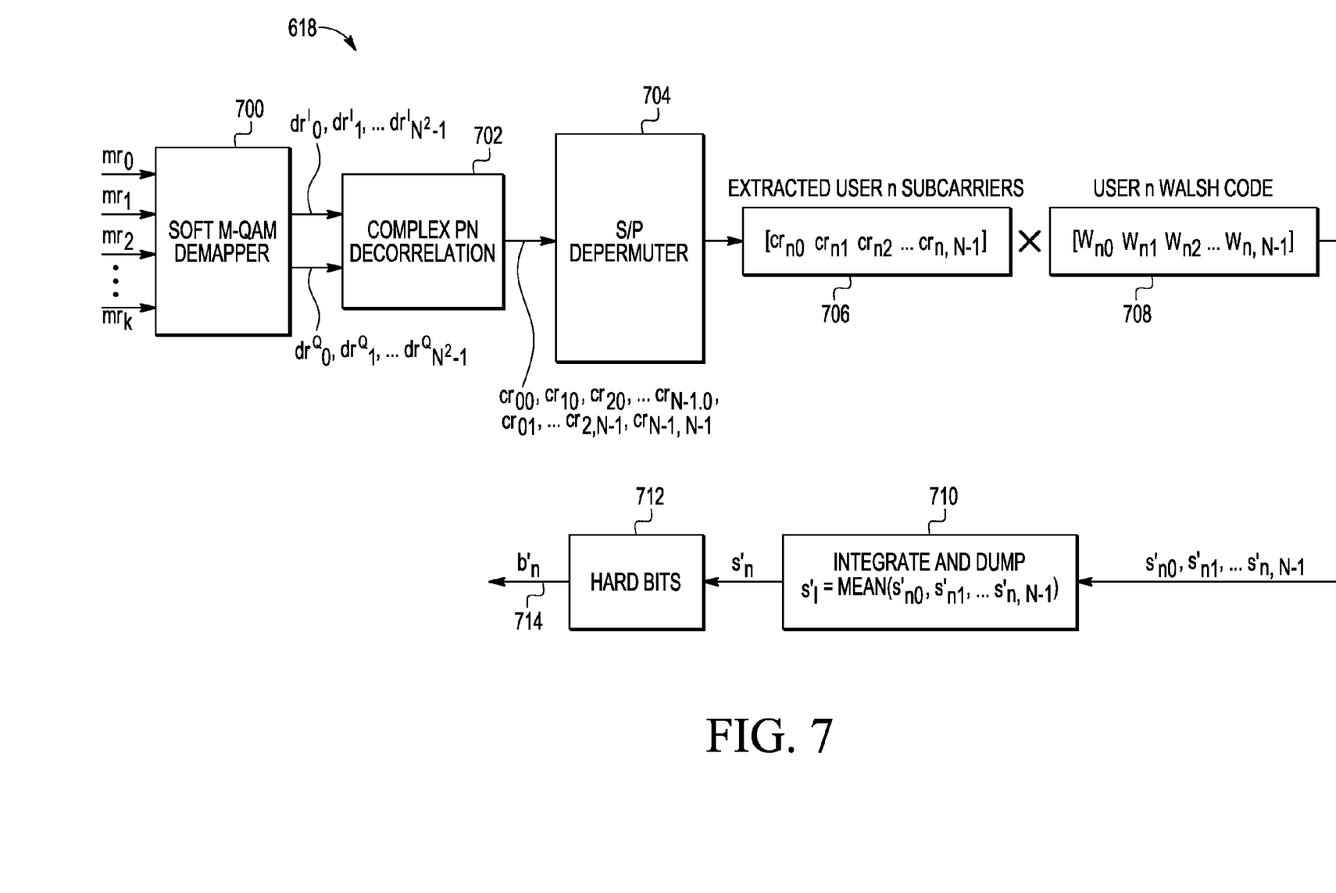
FIG. 7 illustrates a block diagram showing details of a demodulator shown in FIG. 6, in accordance with an embodiment.

In general during operation, the receiver 600 is configured to perform a method that includes receiving from a transmitter over a channel divided into a plurality of adjacent frequency subcarriers, a waveform symbol 602 carrying a different data bit for each of a plurality of receivers, including a data bit 626 for the receiver 600, and determining, e.g., using the block 610, a plurality of modulation symbols from the waveform symbol 602. The method performed in general by the receiver 600 (as shown in FIG. 7) further includes demapping, e.g., using a block 700, the plurality of modulation symbols to generate a representation of at least one sequence of interleaved data symbols having interleaved groups of data symbols generated for the plurality of receivers. The method performed by the receiver 600 also includes decorrelating, e.g., using a block 702, the representation of the at least one sequence of interleaved data symbols based on a first sequence allocated only to the receiver 600 to extract, e.g., using a block 704, only the representation of the group of data symbols generated for the receiver 600. The method performed by the receiver 600 additionally includes dispreading, e.g., in a block 708, the representation of the extracted group of data symbols using a second sequence allocated only to the receiver 600 to ultimately decode the data bit 626.

Particularly during operation of the receiver 600, the CP removal block 604 receives the waveform symbol 602 and removes the cyclic prefix that was added by block 228 of the transmitter 100. Frequency offset compensation is performed on a resulting signal $r_{in[TTI(n)]}$ coming into block 606 to reverse the effects of shifts and rotations to provide a de-rotated signal $r_{out[TTI(n)]}$ to block 608. This de-rotation is especially useful to compensate for Doppler shifts when the receiver 600 is moving during reception. Moreover, as shown, the FO compensation is performed in the time domain, which enables an easier conversion of the signal from the time domain to the frequency domain in the DFT block 610.

The FO compensation block 606 de-rotates the current signal for a time duration TTI based on a frequency offset estimation $\hat{\epsilon}[TTI(n-1)]$ calculated in block 614 for a previous time duration TTI(n−1). For one example, the time duration TTI is based on a data structure of the wireless protocol used to send the data, but can be any suitable time duration that balances the need for accurate estimates with processing requirements to obtain the estimates. For a particular embodiment, the time duration TTI represents the time duration of an LTE frame.

The de-rotated signal is converted, in block 608, from a serial stream to k parallel streams that each includes one of k number of time domain symbols extracted from the waveform symbol 602. The time domain symbols are provided to the DFT block 610. For an embodiment, the DFT block 610 applies an FFT algorithm to the time domain symbols to generate k number of frequency domain modulation symbols.

The channel estimation block 616 estimates the channel conditions from at least some of the symbols output from the FFT block 610. For example, channel estimation can be performed by estimating the effect of the channel on known pilot symbols included with the modulation symbols in the transmitted waveform symbol. Some channel estimation techniques include one-dimensional (1D) and 2D techniques. 1D channel estimation techniques include block-type pilot channel estimation and comb-type pilot channel estimation, in which the pilots are inserted in the frequency direction and in the time direction, respectively. The estimations for the block-type pilot arrangement can be based on least square (LS), minimum mean-square error (MMSE), and modified MMSE. The estimations for the comb-type pilot arrangement include the LS estimator with 1D interpolation, the maximum likelihood estimator, and the parametric channel modeling-based estimator. Other channel estimation strategies include estimators based on simplified 2D interpolations, estimators based on iterative filtering and decoding, and estimators for the systems with multiple transmit-and-receive antennas.

The channel estimation block 616 provides a channel estimation $\tilde{H}^{RS}(n)$ to both the equalizer 612 and the FO estimation block 614, where n is an index of the TTI. For one example, the channel estimation $\tilde{H}^{RS}(n)$ includes an estimate of a scalar coefficient for each subcarrier in the reference block of subcarriers over which the training sequence was transmitted. The FO estimation block 614 uses the channel estimation $\tilde{H}^{RS}(n)$ in its FO calculations. Basically, when the training sequence is transmitted, the frequency offset between the transmitter and receiver results in a phase rotation by the channel of one or more subcarriers carrying the training sequence. Block 614 can determine these phase rotations by determining an angle between the phase of the received subcarrier and the transmitted subcarrier. These angles can then be converted into estimates of the frequency offset $\hat{\varepsilon}(n-1)$, e.g., in kHz, Hz, etc.

For one embodiment, block 614 first computes a correlation between pilot subcarriers, in this example pilot subcarriers 0 and 1, in the reference block of subcarriers, using the following equation:

$$\hat{\gamma}(0, 1, \hat{\varepsilon}(n-1), TTI(n)) = \frac{1}{L \cdot N_{RX}} \sum_{a=0}^{N_{RX}-1} \sum_{i=0}^{L-1} \left(\tilde{H}^{RS}_{a,i,0}(n)\right)^* \cdot \tilde{H}^{RS}_{a,i,1}(n), \quad (2)$$

wherein $\hat{\varepsilon}(n-1)$ is the normalized frequency offset estimation by subcarrier for the TTI; L is the number of reference subcarriers inside the resource block; and $N_{RX}$ is the number of receive antennas. A residual frequency offset estimation $\Delta\hat{\varepsilon}(n)$ can be calculated using the following equation:

$$\Delta\hat{\varepsilon}(n) = \frac{N_{FFT}}{2\pi N_s} \text{angle}\{\hat{\gamma}(0, 1, \hat{\varepsilon}(n-1))\} = \frac{N_{FFT}}{2\pi N_s} \arctan\left\{\frac{\text{Im}(\hat{\gamma}(0, 1, \hat{\varepsilon}(n-1)))}{\text{Re}(\hat{\gamma}(0, 1, \hat{\varepsilon}(n-1)))}\right\}, \quad (3)$$

wherein $N_S$ is the sampling frequency, and $N_{FFT}$ is the number of samples of FFT. The estimate of the FO for the next TTI, $\hat{\varepsilon}(n)$, is given by the following equation:

$$\hat{\varepsilon}(n) = \hat{\varepsilon}(n-1) + \Delta\hat{\varepsilon}(n). \quad (4)$$

The FO compensation block 606 determines its output signal from its input signal using the following equation:

$$r_{out}(TTI(n)) = r_{in}(TTI(n)) \times \exp\left(-2j\pi \frac{N_s(\hat{\varepsilon}(n-1))}{N_{FFT}}\right). \quad (5)$$

Although equations (2) to (5) are written specific to calculations for pilot subcarriers 0 and 1, these equations can be generalized for estimates and correlations between other pilot subcarriers.

The equalizer 612 divides the signal at its input, e.g., the signal that includes the received modulation symbols, by the channel estimate to undo or reverse the effects of the channel on the transmitted waveform 116. The equalizer 612 provides equalized modulation symbols $[mr_0, mr_1, mr_2, \ldots mr_k]$ to the demodulator 618, which processes these symbols to output a hard bit $b'_n$ 714. As shown in FIG. 7, the demodulator 618 include a demapper 700, a decorrelation block 702, a depermuter block 704, a despreader block 708, a filter 710, and a soft bit conversion block 712.

Upon receiving the modulation symbols $[mr_0, mr_1, mr_2, \ldots mr_k]$, the demapper 700 translates these symbols to at least one sequence of interleaved data symbols that includes representations of the interleaved chips that were generated for the plurality of receivers. For the embodiment illustrated, the demapper 700 is a soft QAM demapper that performs demapping based on a quadrature amplitude modulation order selected based on the channel conditions. For example, for a QAM order of QPSK, each two received modulation symbols are translated into a corresponding complex data symbol. Accordingly, representations of I and Q sequences $[dr^I_0, dr^I_1, \ldots dr^{I2}_{N-1}]$ and $[dr^Q_0, dr^Q_1, \ldots dr^{Q2}_{N-1}]$, respectively, of interleaved data symbols are output from the block 700 and provided to the decorrelation block 702. For a particular embodiment, the representation output from block 700 (and output from blocks 708 and 710) is a log-likelihood ratio (LLR), also referred to herein as a soft output. In the case of the block 700, the output is an LLR of the I and Q sequences. However, in other embodiments, the actual data symbols are output from the blocks 700, 708, and 710.

Block 702 decorrelates its received input using a first sequence allocated only to the receiver 600 of the plurality of receivers having data contained in the received waveform symbol 602. In the illustrated embodiment, the first sequence is a complex pseudorandom noise sequence having low correlation to other complex pseudorandom noise sequences allocated to the remaining receivers in the plurality of receivers. The low correlation results in data for the other receivers appearing as noise or as distinguishable weaker signals. The decorrelation block 702 outputs a representation of a sequence $[cr_{00}\ cr_{10}\ cr_{20} \ldots cr_{N-1,0}, cr_{01}, \ldots cr_{2,N-1}, cr_{N-1,N-1}]$ of interleaved data symbols.

The serial to parallel depermuter 704 arranges the sequence $[cr_{00}\ cr_{10}\ cr_{20} \ldots cr_{N-1,0}, cr_{01}, \ldots cr_{2,N-1}, cr_{N-1,N-1}]$ into an N×N matrix. Particular to this described embodiment, the block 704 writes the serial data column-wise into the N×N matrix such that each row of the matrix is a representation of a chip for a different receiver. Block 704 extracts a chip 706 $[cr_{n0}\ cr_{n1}\ cr_{n2} \ldots cr_{n,N-1}]$ for the receiver 600. The low correlation of the PN sequences allocated to the receivers results in data for the other receivers appearing as noise or as easily distinguishable weaker signals, such that the chip 706 for receiver 600 is easily detectable.

The block 708 applies a second sequence to the representation of the group of data symbols 706 for the receiver to despread the chip 706. As illustrated, the second sequence is a Walsh sequence that is orthogonal to other Walsh sequences allocated to the remaining receivers in the plurality of receivers. Since this embodiment of receiver 600 is working with soft outputs, the Walsh sequence used at the transmitter 100 is converted to [−1,1] instead of [0,1]. The decorrelation results in a set of soft bits, e.g., one or more of $s'_{n0}\ s'_{n1}\ s'_{n2} \ldots s'_{n,N-1}$, depending on the number of subcarriers that were recovered based on the channel conditions.

Block 710 applies a first function to the set of soft bits to generate a single soft bit $s'_n$ for the receiver 600. For a particular embodiment, the function is an average or mean of the soft bits, as shown below, which acts as a type of match filter:

$$s'_n = \text{mean}(s'_{n0} s'_{n1} s'_{n2} \ldots s'_{n,N-1}). \quad (6)$$

The block 712 applies a second function to the single soft bit $s'_n$ to result in decoding the data bit for the receiver 600. Particularly, the block 712 converts the soft bit $s'_n$ to the hard bit $b'_n$ 714. Essentially the soft bit provides an estimate of the probability of the bit being a 0 or a 1 and determines the hard bit based on this probability estimate. This can involve a simple comparison such as:

$$\text{if}(s'_n<0), b'_n=0; \text{else } b'_n=1. \quad (7)$$

The block 620, 622, and 624 perform the inverse operations of the blocks 110, 108, and 106 and 104, respectively, to convert the hard bit b'$_n$ 714 to the data bit 626 corresponding to one of the data bits included in the data-in 102 input into and processed by the transmitter 100.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendment made during the pendency of this application and all equivalents of those claims as issued.

For the sake of brevity, well known elements such as some of the elements with the transmitter and/or receiver described herein and other functional aspects of the system may not be described in detail. Furthermore, the connecting lines shown in the various figures contained herein are intended to represent example functional relationships and/or physical couplings between the various elements. It should be noted that many alternative or additional functional relationships or physical connections may be present in a practical embodiment.

The terms "configured to", "configured with", "arranged to", "arranged with", "capable of" and any like or similar terms means that referenced circuit elements have an internal physical arrangement such as by virtue of physical coupling and/or connectivity with other circuit elements in an inactive state. This physical arrangement and/or physical coupling and/or connectivity while in the inactive state enables the circuit elements to perform stated functionality while in the active state of receiving and processing various signals at inputs of the circuit elements to generate signals at the output of the circuit elements. A device or structure that is "configured" in a certain way is configured in at least that way, but may also be configured in ways that are not described. Furthermore, in this document, relational terms such as first and second, top and bottom, and the like may be used solely to distinguish one entity or action from another entity or action without necessarily requiring or implying any actual such relationship or order between such entities or actions.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for generating a waveform for transmitting data to a plurality of receivers over a channel divided into a plurality of adjacent frequency subcarriers, the method comprising:
    receiving a plurality of data bits, each destined for a different receiver of a plurality of receivers;
    for each received data bit, coding the data bit using a unique spreading code of a first set of spreading codes to generate a corresponding group of multiple copies of a data symbol;
    interleaving the groups of data symbols, corresponding to the plurality of data bits, to generate a sequence of interleaved data symbols;
    applying a second set of spreading codes to the sequence of interleaved data symbols to differentiate which group of data symbols is destined for which receiver of the plurality of receivers;
    mapping the sequence of interleaved data symbols to the plurality of adjacent frequency subcarriers to generate a waveform symbol, wherein the mapping comprises applying a modulation scheme to the sequence of interleaved data symbols.

2. The method of claim 1, wherein the sequence of interleaved data symbols is mapped to the plurality of adjacent frequency subcarriers such that no two copies of the data symbol within any group are mapped to directly adjacent frequency subcarriers.

3. The method of claim 1, wherein each spreading code, of the first set of spreading codes, comprises a spreading sequence of length M, and coding the received data bits comprises generating an MXN matrix of the groups of data symbols, wherein N equals the number of receivers in the plurality of receivers, and wherein each row of the matrix comprises the group of data symbols generated for a different one of the received data bits.

4. The method of claim 3, wherein the first set of spreading codes comprises a set of orthogonal time-domain spreading codes.

5. The method of claim 4, wherein the set of orthogonal time-domain spreading codes comprises a set of Walsh sequences.

6. The method of claim 4, wherein the sequence of interleaved data symbols is mapped to the plurality of adjacent frequency subcarriers such that at least a portion of the plurality of adjacent frequency subcarriers are non-orthogonal.

7. The method of claim 3, wherein M equals N.

8. The method of claim 3, wherein interleaving the groups of data symbols to generate the sequence of interleaved data symbols comprises reading the data symbols of the matrix column-by-column into the sequence of interleaved data symbols.

9. The method of claim 1, wherein the second set of spreading codes comprises a set of frequency-domain spreading codes that includes a set of complex pseudorandom noise sequences, wherein each complex pseudorandom noise sequence in the set has low correlation, and each complex pseudorandom noise sequence in the set is assigned to a different receiver in the plurality of receivers.

10. The method of claim 1, wherein mapping the sequence of interleaved data symbols to the plurality of adjacent frequency subcarriers comprises:
    applying a modulation scheme having an adjustable data rate to the sequence of interleaved data symbols to generate a plurality of modulation symbols; and applying an inverse Fast Fourier Transform to the plurality of modulation symbols to generate the first waveform symbol.

11. The method of claim 10, wherein applying the modulation scheme having the adjustable data rate comprises applying a selected one of multiple quadrature amplitude modulation forms each characterized by a different data rate, wherein the one of the multiple quadrature amplitude modulation forms is selected based on conditions of the channel.

12. A system configured to generate a waveform for transmitting data to a plurality of receivers over a channel divided into a plurality of adjacent frequency subcarriers, the system comprising:
   a data spreader configured to receive a plurality of data bits each destined for a different receiver of a plurality of receivers, and, for each received data bit, to code the data bit using a unique data spreading code of a first set of data spreading codes to generate a corresponding group of multiple copies of a data symbol;
   an interleaver coupled to the data spreader and configured to interleave the groups of data symbols, corresponding to the plurality of data bits, to generate a sequence of interleaved data symbols;
   a modulator coupled to the interleaver and configured to apply a modulation scheme and an inverse discreet Fourier transform to the sequence of interleaved data symbols to map the sequence of interleaved data symbols to the plurality of adjacent frequency subcarriers to generate a waveform symbol;
   a coding block coupled between the interleaver and the modulator and configured to apply a second set of spreading codes to the sequence of interleaved data symbols to differentiate which group of data symbols is destined for which receiver of the plurality of receivers.

13. The system of claim 12:
   wherein the data spreader is configured to code the plurality of received data bits using a set of orthogonal spreading codes as the first set of data spreading codes; and
   wherein the modulator is configured to map the sequence of interleaved data symbols to the plurality of adjacent frequency subcarriers such that at least a portion of the plurality of adjacent frequency subcarriers are non-orthogonal.

14. The system of claim 12, wherein the coding block comprises a complex pseudorandom noise sequencer configured to apply, as the second set of spreading codes, a set of frequency-domain spreading codes that includes a set of complex pseudorandom noise sequences, wherein each complex pseudorandom noise sequence in the set has low correlation, and each complex pseudorandom noise sequence in the set is assigned to a different receiver in the plurality of receivers.

15. The system of claim 14, wherein each complex pseudorandom noise sequence in the set includes an in-phase pseudorandom noise sequence and a quadrature pseudorandom noise sequence, wherein the complex pseudorandom noise sequencer comprises:
   a first linear feedback shift register configured to generate a set of in-phase pseudorandom noise sequences for applying to the sequence of interleaved data symbols to generate an in-phase sequence of interleaved data symbols; and
   a second linear feedback shift register configured to generate a set of quadrature pseudorandom noise sequences for applying to the sequence of interleaved data symbols to generate a quadrature sequence of interleaved data symbols;
   wherein each complex pseudorandom noise sequence in the set has minimal correlation, and each complex pseudorandom noise sequence in the set is assigned to a different receiver in the plurality of receivers;
   wherein the modulator is configured to apply to the in-phase and quadrature sequences of interleaved data symbols, as the modulation scheme, a selected one of multiple quadrature amplitude modulation orders each characterized by a different data rate, wherein the one of the multiple quadrature amplitude modulation orders is selected based on conditions of the channel.

16. The system of claim 12:
   wherein the data spreader is configured to generate a matrix having M rows of the data symbols, where M equals the number of receivers in the plurality of receivers, and where each row of the matrix comprises the group of data symbols generated for a different one of the received data bits;
   wherein the interleaver is configured to read the data symbols of the matrix columnwise into the sequence of interleaved data symbols.

17. A method for decoding a waveform symbol having data for a plurality of receivers, the method comprising:
   receiving, by a first receiver from a transmitter over a channel divided into a plurality of adjacent frequency subcarriers, a waveform symbol carrying a different data bit for each of a plurality of receivers, including a first data bit for the first receiver;
   determining a plurality of modulation symbols from the waveform symbol;
   demapping the plurality of modulation symbols to generate a representation of at least one sequence of interleaved data symbols comprising interleaved groups of data symbols generated for the plurality of receivers;
   decorrelating the representation of the at least one sequence of interleaved data symbols based on a first sequence allocated only to the first receiver of the plurality of receivers to extract only the representation of the group of data symbols generated for the first receiver;
   despreading the representation of the extracted group of data symbols using a second sequence allocated only to the first receiver of the plurality of receivers to decode the first data bit for the first receiver.

18. The method of claim 17:
   wherein the demapping is based on a quadrature amplitude modulation order selected based on detected conditions of the channel;
   wherein the first sequence is a complex pseudorandom noise sequence having low correlation to other complex pseudorandom noise sequences allocated to the remaining receivers in the plurality of receivers;
   wherein the second sequence comprises a Walsh sequence that is orthogonal to other Walsh sequences allocated to the remaining receivers in the plurality of receivers.

19. The method of claim 17, wherein the despreading generates a set of soft bits, the method further comprising:
   applying a first function to the set of soft bits to generate a single soft bit for the first receiver;
   applying a second function to the single soft bit to decode the first data bit for the first receiver.

20. The method of claim 17 further comprising performing frequency offset compensation to the waveform symbol before applying a discreet Fourier transform to the waveform symbol, wherein the discreet Fourier transform is used in determining the plurality of modulation symbols from the waveform symbol.

\* \* \* \* \*